United States Patent
Tehini et al.

(10) Patent No.: US 11,262,739 B2
(45) Date of Patent: Mar. 1, 2022

(54) ARTIFICIAL INTELLIGENCE/MACHINE LEARNING DRIVEN ASSESSMENT SYSTEM FOR A COMMUNITY OF ELECTRICAL EQUIPMENT USERS

(71) Applicant: HITACHI ENERGY SWITZERLAND AG, Baden (CH)

(72) Inventors: Lony Tehini, Montreal (CA); Luiz Cheim, St. Charles, MO (US); Stephen Pearce, Edinburgh (GB)

(73) Assignee: Hitachi Energy Switzerland AG, Baden (CH)

( * ) Notice: Subject to any disclaimer, the term of this patent is extended or adjusted under 35 U.S.C. 154(b) by 138 days.

(21) Appl. No.: 16/561,269

(22) Filed: Sep. 5, 2019

(65) Prior Publication Data

US 2021/0072741 A1    Mar. 11, 2021

(51) Int. Cl.
*G05B 23/02* (2006.01)
*G06N 5/02* (2006.01)
(Continued)

(52) U.S. Cl.
CPC ....... *G05B 23/0254* (2013.01); *G05B 23/024* (2013.01); *G06K 9/6278* (2013.01); *G06N 5/022* (2013.01); *G06Q 50/06* (2013.01)

(58) Field of Classification Search
CPC .............. G05B 23/0254; G05B 23/024; G06K 9/6278; G06N 5/022; G06Q 50/06; G06Q 50/01; G06Q 10/20
See application file for complete search history.

(56) References Cited

U.S. PATENT DOCUMENTS 7,239,977 B2   7/2007   Fantana et al.
7,246,014 B2   7/2007   Forth et al.
(Continued)

FOREIGN PATENT DOCUMENTS

CN   108876197 A   * 11/2018
CN   108921457 A   * 11/2018
WO   2012142355      10/2012

OTHER PUBLICATIONS

Bhowmick et al., "Private-IYE: A Framework for Privacy Preserving Data Integration"; Proceedings of the 22nd International Conference on Data Engineering Workshops, 2006 (Year: 2006).*
(Continued)

*Primary Examiner* — John C Kuan
(74) *Attorney, Agent, or Firm* — Sage Patent Group

(57) ABSTRACT

An Artificial Intelligence/Machine Learning driven assessment system for monitoring electrical equipment assets includes a computer system that is configured to receive user-provided asset data associated with operation of a plurality of electrical equipment assets operated by a plurality of users/owners, where the identity of any asset in the database is restricted and only known to the user that owns/operates the asset. The computer system is configured to analyze the user data in conjunction with a pooled knowledge database so as to generate courses of action or assessments for the monitored electrical equipment assets and to update the analysis process based on feedback from a comparison of the assessment or course of action with an actual outcome.

20 Claims, 3 Drawing Sheets

(51) Int. Cl.
    *G06Q 50/06*     (2012.01)
    *G06K 9/62*     (2022.01)

(56) References Cited

U.S. PATENT DOCUMENTS

| | | |
|---|---|---|
| 9,465,398 B2 | 10/2016 | Forbes, Jr. |
| 10,001,518 B2 | 6/2018 | Cheim et al. |
| 10,176,279 B2 | 1/2019 | Nicholas |
| 10,310,453 B2 | 6/2019 | Cheim et al. |
| 2014/0025211 A1* | 1/2014 | Cheim .............. H02J 13/00034 700/286 |
| 2015/0066782 A1* | 3/2015 | Vainberg ................ G06Q 10/20 705/305 |
| 2016/0343093 A1 | 11/2016 | Riland et al. |
| 2017/0005967 A1* | 1/2017 | Simpson .............. G06Q 10/101 |
| 2017/0017934 A1* | 1/2017 | Bou-Ghannam ...... G06Q 10/20 |
| 2017/0302649 A1* | 10/2017 | Singh .................... H04L 63/083 |
| 2017/0353991 A1* | 12/2017 | Tapia ................. H04L 41/0631 |

OTHER PUBLICATIONS

Wei et al., "Research on Unstructured Text Data Mining and Fault Classification Based on RNN-LSTM with Malfunction Inspection Report" Energies 2017 (Year: 2017).*

* cited by examiner

ARTIFICIAL INTELLIGENCE/MACHINE LEARNING DRIVEN ASSESSMENT SYSTEM FOR A COMMUNITY OF ELECTRICAL EQUIPMENT USERS

TECHNICAL FIELD OF THE DISCLOSURE

Generally, the present invention relates to an electrical equipment assessment system. Particularly, the present invention relates to an Artificial Intelligence/Machine Learning driven assessment system for electrical equipment assets belonging to a community of electrical equipment users.

BACKGROUND

Electrical equipment asset condition diagnostics today are based on sets of rules determined by industry standards and expert studies. There are many resources users can draw upon for maintenance and diagnosis, such as operating manuals, industry experts, and experience. There are forums where users of the equipment can exchange experiences about equipment failures and solutions that have been implemented, such as at conferences and meetings and the like.

However, these methods for exchanging information suffer from several drawbacks. For example, feedback in implementing the solutions is not readily shared among all users of the equipment. Possible solutions may not reach the most pertinent users if they do not participate in the forum. Furthermore, linking of solutions for particular issues and the users needing these solutions may not occur due to lack of participation or sharing of the information among users at the forum. Also, such exchanges are not anonymous and therefore information sharing may be limited due to confidentiality and other issues.

In addition, operators and other users of electrical equipment assets, such as in power distribution network, can be overwhelmed with massive amounts of operating data, particularly with the growing worldwide trend in the use of online sensors for multiple operating parameters, that is difficult to interpret and manage because such data is not compiled as actionable information that can be readily interpreted by the various operational/organizational levels of the power distribution. Moreover, because such data may be aggregated from only the electrical equipment assets owned by that particular user, it is a substantial challenge to aggregate and process such data to identify relevant information from multiple owners which can be communicated in an appropriate format to the various other owners of the similar types of the electrical equipment assets. Typically owners of a given asset type do not learn from or openly exchange information with other owners of the same asset type, for reasons of data privacy, eventual regulations, and legal issues. Since there is a large number of owners that detain a small number of assets, the asset population of each owner may be statistically not significant for a number of studies that would otherwise be highly significant if the number of assets were high. Therefore, further improvements in this technological area are needed.

SUMMARY

In light of the foregoing, the present disclosure provides an Artificial Intelligence (AI)/Machine Learning (ML) driven assessment system for a community of users of a plurality of electrical equipment assets. According to one aspect, an AI/ML driven assessment system is provided for one or more communities of users of the electrical equipment assets that is configured to anonymously share operational data and analysis of the data with multiple users/owners of the electrical equipment to provide intelligent data outputs regarding the condition of an asset or group of assets, as well as to provide actionable information or recommended responses so that informed decisions regarding operation and maintenance can be made. Individual users would benefit from a much larger pool of assets and knowledge extracted from that pool without seeing the entire population or having access to assets that are not their own.

Furthermore, there is a need for an AI/ML driven assessment system for electrical equipment assets that provides information that will be accessible remotely by any member of the community of users at any time by controlled subscription and limited vision of the system but full access to the statistical analysis and AI/ML applications that result from that analysis and from the common pool of data. Additionally, there is a need for an AI/ML driven assessment system for electrical equipment assets that dynamically and continuously updates how the data is analyzed to provide the recommended course of action or assessment based on feedback of actual implementations of the courses of action or assessments by the user community of the electrical equipment assets.

In addition, there is a need for an AI/ML driven assessment system for electrical equipment assets that provides one or more databases to create a pool of knowledge data that includes or that creates links to different databases having electrical equipment asset data obtained from any source, such as experts, user manuals, operating procedures, social media, industry standards and publications, and information sources of various manufacturers and models related to each electrical equipment asset being monitored. Asset data can also be provided from the users such as off-line records (such as diagnosis, maintenance and operation history), as well as on-line operational data captured by on-line sensors. Still yet, there is a need for an AI/ML driven assessment system that provides an artificial intelligence analysis that uses the pooled knowledge and user collected or provided electrical equipment asset data to train machine learning algorithms for parameter estimation, data forecasting, probabilistic end of life assessment, and failure prediction, for example, to output actionable information to provide a recommended response based on the current operating state of the electrical equipment.

Further embodiments, forms, objects, features, advantages, aspects and benefits of the disclosure shall become apparent from the following description and drawings.

BRIEF DESCRIPTION OF THE DRAWINGS

These and other features and advantages of the present invention will become better understood with regard to the following description and accompanying drawings wherein.

DETAILED DESCRIPTION OF THE DISCLOSE EMBODIMENTS

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

Figure 1:
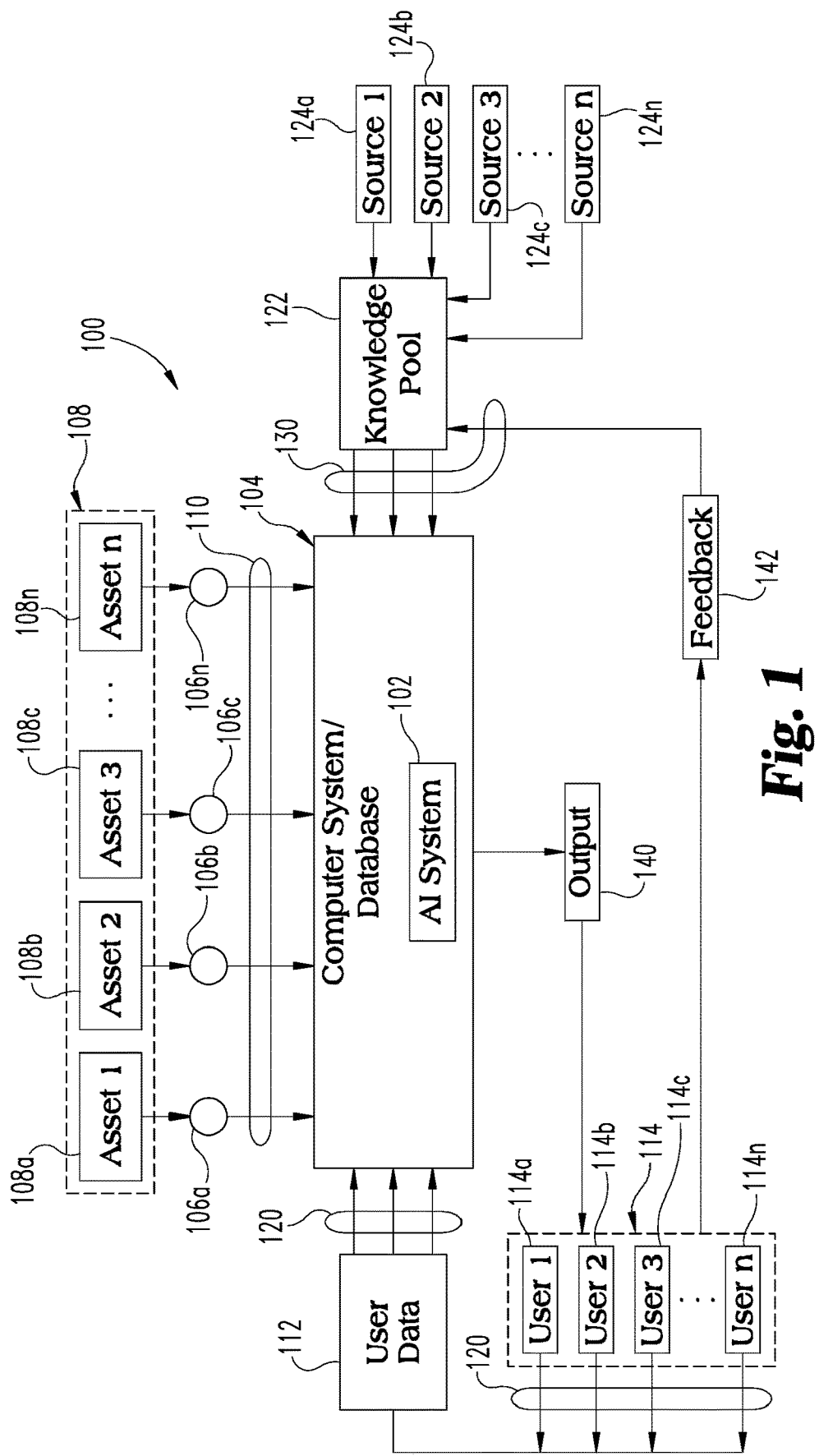
FIG. 1 is a block diagram of an AI/ML driven assessment system for electrical equipment assets of a community of users in accordance with the present disclosure.

An AI/ML driven assessment system for electrical equipment or assets is generally referred to by numeral 100, as shown in FIG. 1 of the drawings. It should be appreciated that the term "electrical equipment" or "electrical equipment asset(s)" is defined herein as one or more electrical components that are associated with a community of users of those components. Examples where such electric components may be employed include, but are not limited to, any one or combination of two or more power generation systems, power transmission networks, power distribution networks, industrial power networks, microgrids, substations, etc. Such electrical equipment assets may include, but are not limited to, transformers, circuit breakers, switches, surge arresters, batteries, cooling systems, power line and line connections, relays, or any other device that may be employed in such systems.

In addition, the system 100 can be used to monitor any electrical equipment asset, including multiple asset types, that are owned by different users in a community of users 114. The system 100 is configured to continuously acquire operating parameter data provided by the users from operations (load, ambient temperature, etc.), site tests and measurements, laboratory results (typically off-line), and/or on-line sensors associated with the operation of the electrical equipment assets and a pool of knowledge data for the electrical equipment assets that is analyzed by an artificial intelligence (AI) system 102. Specifically, the AI system 102 may be embodied in hardware, instructions encoded on a computer readable medium, or a combination of both, and is configured to provide information such as a course of action or assessment for a particular electrical equipment asset based on all user-provided asset data for the plurality of electrical equipment assets while maintaining confidentiality of identity so that each user can only identify electrical equipment assets and the associated user-provided asset data for the electrical equipment assets which they own/operate. The users provide feedback regarding the courses of action that are taken and associated outcomes to enhance the analysis and improve future predictions for recommended courses of action and assessments based on the user-provided asset data and pooled knowledge data.

Specifically, the system 100 includes a centralized or distributed database or computer system 104 (referred to herein as "computer system 104") that is configured with the necessary hardware and software to execute the hardware and/or computer readable medium encoded instructions comprising the AI system 102. The AI system 102 may be hosted on a cloud computing platform accessible by the users, a central computing system, or locally on one or more computers of the community of users 114. In addition, the computer system 104 may be configured to obtain on-line operating parameter data from a plurality of on-line sensors 106a, 106b, 106c, . . . 106n either directly as shown, or from the users 114. The on-line sensors 106a-n may comprise any suitable type of sensor configured to monitor and collect operating parameter data associated with a plurality of corresponding electrical equipment assets 108a, 108b, 108c, . . . 108n that are part of a community of electrical equipment assets 108 owned by the community of users 114. It should be appreciated that the system 100 may be configured to monitor on-line operating parameters of any number and type of electrical equipment assets with sensors 106a-106n, as previously discussed. Furthermore, the computer system 104 is hardware independent, as it is able to compatibly receive on-line data from the on-line sensors 106a-n of any make, model, or type of electrical equipment asset and independently of any data protocol used by such sensors 106a-n.

In addition to acquiring on-line operating parameter data directly from sensors and/or from the users 114, the computer system 104 may also acquire off-line operating parameter data and other data from the user-provided data in storage system 112. The user-provided data stored at the storage system 112 can be acquired directly or indirectly from users 114a, 114b, 114c, . . . 114n that form the community of users 114 that own and/or operate the community of electrical equipment assets 108. The user-provided data storage system 112 may comprise any suitable mass storage device or database, and is configured store on-line and/or off-line operating parameter data relating to the electrical equipment assets 108a-108n, such as asset identification, asset owner, asset manufacturer, asset specifications, off-line test data and analysis, maintenance information, historical operating parameter information, performance information, and the like that is provided by the users 114a-114n for the assets owned and/or operated thereby.

The user-provided data storage system 112 and/or computer system 104 can be a multi-query, customizable dynamic and encrypted database so that the off-line operating parameter data, user data, and/or on-line operating parameter data can be stored grouped or filtered into data pools that is asset specific (e.g. separated based on whether the assets is a transformer or circuit breaker) and can be further filtered or sorted based on any suitable combination of features such as transformers above a certain size or manufactured by a certain manufacturer. In certain embodiments, information sharing and storage may be accomplished by blockchain technology. Analysis of the operating parameter data (on-line and/or off-line) can also be performed to provide statistical descriptions and correlations, identify trends and norms, and to generate flags or detect abnormalities. The analysis can be selectively performed on assets 108a-108n that are in a similar class or of the same type or family. Within the user-provided data storage system 112 and/or computer system 104, each user can only specifically identify data and associated assets that the user provided from its respective assets 108a-108n, but the analysis of the data based on the aggregated data from the community of assets 108 can be available to all of the community of users 114.

The computer system 100 is also configured to be communicatively coupled to pooled knowledge database 122. Specifically, the pooled knowledge database 122 contains various knowledge about the assets 108a-108n that is pooled from a plurality of data sources 124a, 124b, 124c, . . . 124n associated with the assets 108a-108n. Sources 124a-124n can include, for example, user procedures, manufacturer experts, industry standards and know-how, industry literature, books, articles, reports, and social media.

The AI system 102, which may also be called "Supermind", executed by the computer system 104 can analyze the on-line operating parameter data for assets 108a-108n received from the on-line sensors 106a-106n, the user-provided data for assets 108a-108n from storage system 112, and knowledge pool from the pooled knowledge database 122 to dynamically update a recommended course of action or assessment for the operation of each asset 108a-108n in the asset community 108 based on knowledge automatically extracted from the asset-expert-driven "knowledge pool" and search for all available information, records and data that may indicate possible scenarios related to for example a course of failure mode and using AI/ML tools select the most likely scenario, given the evidence. Such courses of action or assessment can be to, for example, perform maintenance, change an operating parameter, shed load to mitigate an operational risk, alter an output and/or input, in order to avoid damage to, failure of, or improve the performance of one or more of the electrical equipment assets 108a-108n.

The AI system 102 can operate by use of machine learning (ML) Natural Language Processing (NLP) to provide an output 140 that includes a course of action and/or assessment to the user 114 of the associated asset 108a-108n. For example, AI system 102 can be configured to perform a probabilistic multi-scenario failure mode investigation for a filtered asset type using the data from user-provided data storage system 112, the on-line asset data from sensors 106a-106n (if provided), and/or a combination of the knowledge pool from the pooled knowledge database 122. The course of action or assessment can be based on the latest information/knowledge uploaded to the pooled knowledge database 122 with probabilistic estimations of hypotheses and the required bodies of evidence to assist in the decision-making process about the most likely course of action or assessment, its causes and evidences, and the respective likelihoods or probabilities.

System 100 also includes a feedback mechanism 142 to train the AI system 102 to continually improve the outputs 140. The feedback mechanism 142 can include the users 114 anonymously sharing outcomes of actions taken in response to the output(s) 140 that are received by the user 114a-114n. Other embodiments contemplate non-anonymous information sharing and/or information sharing that complies with data privacy laws and/or data privacy rules. This information is fed to pooled knowledge database 122 and to the AI system 102 so the statistical tools and algorithms can achieve improved predictions for the outputs 140. The users 114 can also receive the feedback 142 that is provided to train the AI system 102 by another user 114. The users 114a-114n therefore are each provided access to knowledge and experience from specific failures and failure modes that happen on the entire community of electrical equipment assets 108-108n from a large number users 114a-114n in a community of users 114 and the responses thereto, and not just the user's own experience or own assets.

The feedback mechanism 142 can be used in the training of multiple ML algorithms with the intent of making parameter estimation, data forecasting, failure prediction, or other course of action or assessment more accurate and useful. The hypothesis testing and most likely failure mode can be indicated with all supporting evidence and probabilities. Each user 114a-114n is provided with actionable information and recommendations for operations and maintenance of their respective electrical equipment assets 108a-108n. The process is dynamic requiring feedback from the maintenance or operating changes made by each user 114a-114n to update the pooled knowledge database 122, which then trains the ML algorithms based on the feedback. System 100 can operate in a continuous loop to provide users 114a-114n with the most up-to-date information/knowledge available from the pooled knowledge database 122.

The outputs 140 generated by the system 100 may comprise data embodied in any suitable medium, such as an electronic medium, including, but not limited to, email messages, web pages, computer interfaces (GUI—graphical user interfaces), electronic documents, or any other medium or format, which provides data in any suitable format and at the appropriate level of granularity needed by users 114 to make operating decisions regarding the operation and maintenance of their respectively owned and operated electrical equipment assets 108. The output 140 may be communicated to any suitable computing device, including handheld electronic devices or other desktop or portable computers systems or the like, in which the output 140 is presented thereon using various modes including, but not limited to electronic messaging (email, text messages, etc. . . . ), automatically updated web pages and the like. In one aspect, output 140 may be communicated to the computing device through an enterprise local area network (LAN) using a web-like application tool.

Any suitable interfaces between the computer system 104 and the sensors 106a-106n, user-provided data storage system 112, and/or pooled knowledge database 122. Example interfaces include an on-line data interface 110, a user-provided data interface 120, and a pooled knowledge data interface 130. For the purpose of the following discussion, the interfaces 110-120 may comprise any suitable data communication interface, such as an ETHERNET/TCP IP port for example. Furthermore, it should be appreciated that the on-line data interface 110 may utilize any suitable data protocol, such as DNP3.0, MODBUS, IEC61850, or may alternatively comprise an analog or "on-off" hard contact output, which is converted into digital data at an electrical substation gateway prior to reaching the computer system 104 where a larger database incorporates all of the on-line data. The on-line data interface 110 provided by the system 100 can be configured to be coupled to and configured to receive data from one or more on-line sensors 106a-106n that are operatively attached to each of the electrical equipment assets 108a-108n. It should be appreciated that each asset 108a-108n may include one or more sensors represented by sensors 106a-106n.

The user-provided data interface 120 and/or knowledge pool data interface 130 provided by the system 100 is configured to be coupled to receive data from the user-provided data storage system 112 and pooled knowledge database 122, respectively. Databases 112, 122 may store data in any format or configuration, such as EXCEL, ACCESS, or ORACLE-based files, for example. It should be appreciated that the interface 120, 130 provided by the computer system 104 may comprise OPC (open connectivity) or SQL (sequential query logic) or by using any other suitable computer programming language or routine.

Figure 2:
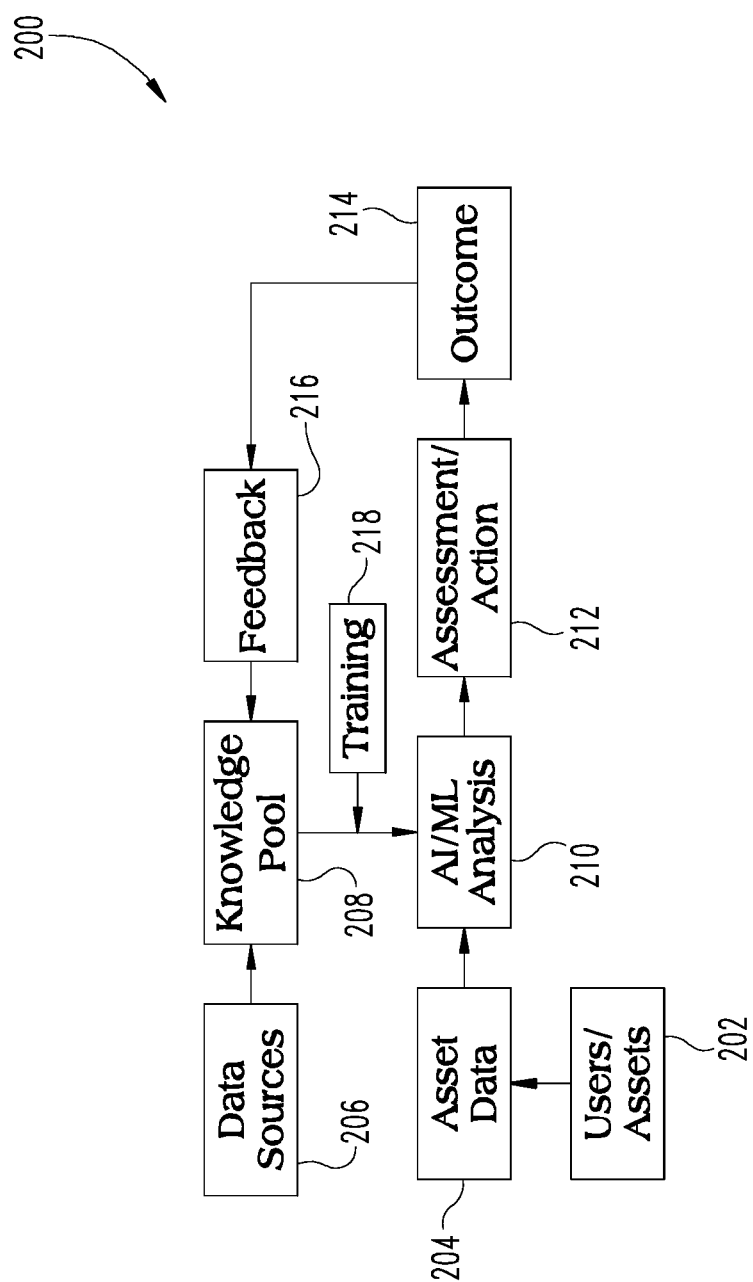
FIG. 2 is a block diagram of a process for an AI/ML driven assessment system for electrical equipment assets of a community of users.

Referring to FIG. 2, an embodiment of a process 200 is shown that can be implemented by system 100 such as discussed above. Process 200 includes a block 202 in which a plurality of users and/or assets provide asset data to a block 204, such as the user-provided asset data and on-line operating parameter data discussed above. In addition a plurality of data sources at block 206 are continuously updated to provide expert data, procedure manuals, industry data, etc. about the assets to the pooled knowledge block 208.

At block 210 an AI analysis of the user-provided data and/or on-line operating parameter data is performed in conjunction with the pooled knowledge data to provide a recommended course of action or assessment at block 212. The AI analysis can include engineering models (based on statistics, rule-based systems) associated with the operation of the particular type of electrical equipment asset 108a-108n being monitored by the system 100 to provide further recommended responses to the respective users of the assets 108a-108n.

Thus, the AI analysis can be configured to identify the evolution or change in the operating parameters of the electrical equipment assets 108a-108n using statistical tools, while also "learning" by assessing the outcome of the action taken by the user at block 214 in response to the recommended course of action or assessment. As a result, process 200 incorporates user feedback at block 216 into the knowledge pool 208 and provides training at block 218 to improve the AI analysis based on feedback from the users. As such, the AI analysis incorporates "asset experience" into the analysis using various artificial intelligence techniques, such as fuzzy logic, Bayes belief propagation networks, neural networks and/or genetic algorithm tools, and the like. The AI analysis can also indicate the relative deviation of operating parameters (or multiple parameters) of a specific asset 108a-108n as compared to the same or similar assets in the asset community that have at least one common characteristic (i.e. ratings, accessories, origin of manufacturing, etc.). The AI/ML system may utilize multiple learning mechanisms (such as supervised, unsupervised and reinforcement learning) as well as multiple types of ML Algorithms (linear, non-linear, combined) such as for example, Artificial Neural Networks, Random Forest, Support Vector Machines, Gradient Boosting Machine and derivatives such as Extreme Gradient Boosting Machine, Classification and Regression Trees, Logistic Regression, among others. The AI/ML system will also apply multiple types of Natural Language Processing (NLP) algorithms to classify, summarize, identify scenarios and their likelihoods given the actual data analyzed by system.

It will, therefore, be appreciated that one advantage of one or more embodiments of the present disclosure is that an AI/ML driven assessment system for electrical equipment assets provides users with direct access to courses of action or assessments for their asset(s) of interest that is based on analysis of information expert assessment of a plurality of assets of other users in addition to the asset(s) of interest. Another advantage of the present disclosure is that the AI/ML driven assessment system for electrical equipment assets provides an open and flexible interface that is able to acquire information for a plurality of assets from various databases and is able to integrate, analyze and provide access to the data while maintaining anonymity of the particular owners of the assets. Still another advantage of the present disclosure is that the AI/ML driven assessment system for electrical equipment assets is configured to monitor the outcomes of courses of actions or assessments and update the analysis process based on feedback from the outcomes.

Figure 3:
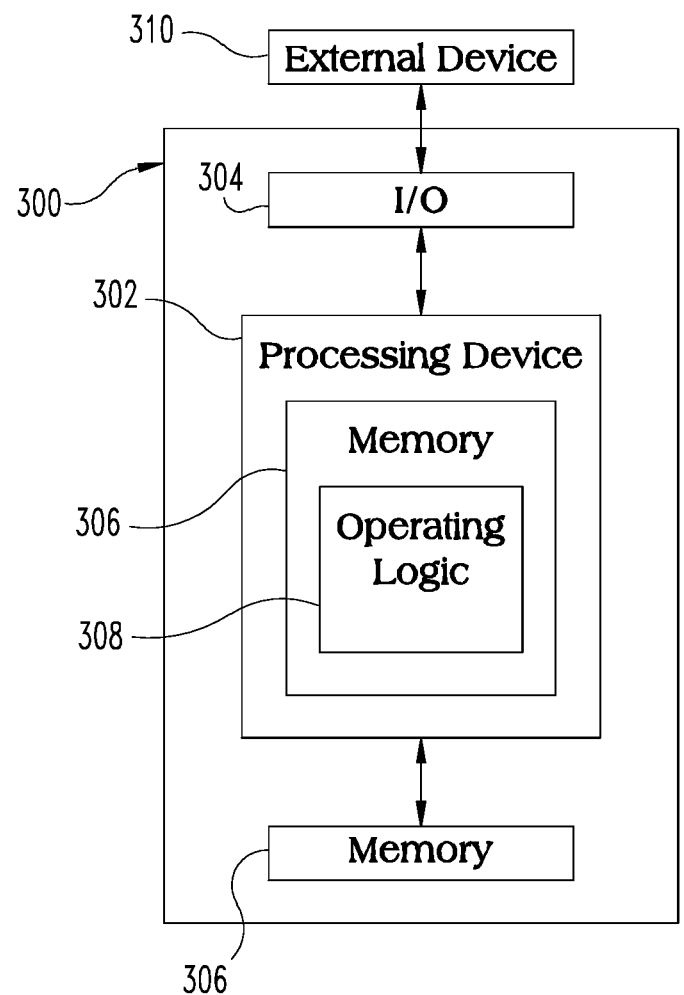
FIG. 3 is a block diagram illustrating an exemplary control system.

With reference to FIG. 3 there is illustrated a schematic block diagram of an exemplary control system 300 such as one or more of AI system 102, computer system 104, user-provided data storage system 112, and pooled knowledge database 122. Control system 300 includes a processing device 302, an input/output device 304, memory device 306, and operating logic 308. Furthermore, the computing device 300 communicates with one or more external device 310, including other databases or computer systems discussed herein. Control system 300 may be a stand-alone device, an embedded system, or a plurality of devices structured to perform the functions described with respect to system 300.

Input/output device 304 enables control system 300 to communicate with local field devices or other agents or control systems. Input/output device 304 may include a network adapter, network credential, interface, or a port (e.g., a USB port, serial port, parallel port, an analog port, a digital port, VGA, DVI, HDMI, FireWire, CAT 5, Ethernet, fiber, or any other type of port or interface), to name but a few examples. Input/output device 304 may include more than one of these adapters, credentials, or ports, such as a first port for receiving data and a second port for transmitting data.

Processing device 302 may include one or multiple processors, Arithmetic-Logic Units (ALUs), Central Processing Units (CPUs), Digital Signal Processors (DSPs), or Field-programmable Gate Arrays (FPGAs), to name but a few examples. For forms of processing devices with multiple processing units, distributed, pipelined, or parallel processing may be used. Processing device 302 may be dedicated to performance of only the operations described herein or may be used in one or more additional applications. Processing device 302 may be of a programmable variety that executes algorithms and processes data in accordance with operating logic 308 as defined by programming instructions (such as software or firmware) stored in memory 306. Alternatively or additionally, operating logic 308 for processing device 302 is at least partially defined by hardwired logic or other hardware. Processing device 302 may comprise one or more components of any type suitable to process the signals received from input/output device 304 or elsewhere, and provide desired output signals. Such components may include digital circuitry, analog circuitry, or a combination of both.

Memory device 306, also known as a computer readable medium, may be of one or more types of memory, such as a solid-state variety, electromagnetic variety, optical variety, or a combination of these forms, to name but a few examples. Furthermore, memory device 306 may be volatile, nonvolatile, transitory, non-transitory or a combination of these types, and some or all of memory device 306 may be of a portable variety, such as a disk, tape, memory stick, or cartridge, to name but a few examples. In addition, memory device 306 may store data that is manipulated by operating logic 308 of processing device 302, such as data representative of signals received from and/or sent to input/output device 304 in addition to or in lieu of storing programming instructions defining operating logic 308, just to name one example. Memory device 306 may be included with processing device 302 and/or coupled to processing device 302.

Further written description of a number of exemplary aspects of the present disclosure and various embodiments shall now be provided. In one aspect, an AI/ML driven assessment system for electrical equipment includes a plurality of electrical equipment assets operated by a plurality of users where each of the users operates at least one associated electrical equipment asset from the plurality of electrical equipment assets. The AI/ML driven assessment system also includes at least one database configured to store user-provided asset data from the plurality of users that is associated with the plurality of electrical equipment assets. The at least one database further includes a pooled knowledge database relating to the electrical equipment assets. Each respective one of the plurality of users can identify from the at least one database only the at least one electrical equipment asset that is operated by the associated user. The AI/ML driven assessment system also includes a computer system in operative communication with the at least one database. The computer system is configured to analyze the user-provided asset data for the plurality of electrical equipment assets in conjunction with the pooled knowledge database and generate a course of action or assessment from the analysis for one of the plurality of users and the at least one associated electrical equipment asset based on the user-provided asset data for the plurality of electrical equipment assets and the pooled knowledge database.

In one embodiment, the pooled knowledge database includes expert data, industry data, and asset data for said plurality of electrical equipment assets. In a refinement of this embodiment, the asset data includes procedures and reports for operation of the plurality of electrical equipment assets. In another refinement, the pooled knowledge database is separated into classifications based on types of the plurality of electrical equipment assets.

In another embodiment, the computer system is configured to generate the course of action or assessment using machine learning natural language processing. In yet another embodiment, the course of action or assessment includes one or more of parameter estimation, data forecasting, and failure prediction for the at least one of the plurality of electrical equipment assets.

In still another embodiment, the computer system uses artificial intelligence to generate the recommended course of action or assessment for the at least one of said electrical equipment assets. In another embodiment, the plurality of electrical equipment assets include at least one of a transformer and a circuit breaker.

In yet another embodiment, the pooled knowledge database is updated by the one of the plurality of users in response to an outcome of the one of plurality of users executing the course of action or assessment on the at least one of the plurality of electrical equipment assets. In a refinement of this embodiment, the computer system is configured to update the analysis for determining the course of action or assessment in response to the update of the pooled knowledge database. In a further refinement, each of the plurality of users has access to the computer system for the updated analysis of the user-provided asset data for the plurality of electrical equipment assets in conjunction with the pooled knowledge database. In still a further refinement, the plurality of users receive the course of action or assessment based on the updated analysis only for those electrical equipment assets operated by the associated user.

According to another aspect of the present disclosure, a method of assessing at least one electrical equipment asset includes: storing user-provided asset data regarding operation of a plurality of the electrical equipment assets in a database, where the plurality of electrical equipment assets are operated by a plurality of users, and further where each of the plurality of users can only identify from the at least one database the respective electrical equipment assets and associated user-provided asset data that are operated by the respective user; generating a pooled knowledge database for the plurality of electrical equipment assets; acquiring the user-provided asset data and the pooled knowledge database at a computer system in operative communication with the at least one database; analyzing the user-provided asset data and the pooled knowledge database with the computer system; generating a course of action or assessment from the analysis for at least one of the plurality of electrical equipment assets; and providing the course of action or assessment to the respective user that operates the at least one of the plurality of electrical equipment assets.

In one embodiment, the method includes providing a display in operative communication with said computer system and displaying the course of action or assessment on the display. In another embodiment, the pooled knowledge database includes expert data, industry data, user procedures, and user reports.

In yet another embodiment, the computer system is configured to generate the course of action or assessment using machine learning natural language processing. In another embodiment, the course of action or assessment includes one or more of parameter estimation, data forecasting, and failure prediction. In still another embodiment, the computer system uses artificial intelligence to generate the course of action or assessment.

In another embodiment, the pooled knowledge database is updated by the respective user in response to feedback from executing the course of action or assessment on the at least one of the plurality of electrical equipment assets, and the computer system is configured to update one or more algorithms for performing the analysis based on the feedback.

In yet another embodiment, each of the plurality of users has access to analysis of the user-provided asset data for all of the plurality electrical equipment assets, and the plurality of users receive the course of action or assessment only for the respective electrical equipment assets operated by the respective user.

While the present disclosure has been illustrated and described in detail in the drawings and foregoing description, the same is to be considered as illustrative and not restrictive in character, it being understood that only certain exemplary embodiments have been shown and described, and that all changes and modifications that come within the spirit of the present disclosure are desired to be protected. It should be understood that while the use of words in the description above may indicate that the feature so described may be more desirable, it nonetheless may not be necessary, and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. The term "of" may connote an association with, or a connection to, another item, as well as a belonging to, or a connection with, the other item as informed by the context in which it is used. The terms "coupled to," "coupled with" and the like include indirect connection and coupling, and further include but do not require a direct coupling or connection unless expressly indicated to the contrary. When the language "at least a portion" and/or "a portion" is used, the item can include a portion and/or the entire item unless specifically stated to the contrary.

What is claimed is:

1. An Artificial Intelligence/Machine Learning (AI/ML) driven assessment system for electrical equipment, comprising:

a plurality of electrical equipment assets operated by a plurality of users, wherein each user of said plurality of users operates at least one associated electrical equipment asset from said plurality of electrical equipment assets;

at least one database configured to store user-provided asset data from said plurality of users that is associated with the plurality of electrical equipment assets, the at least one database further including a pooled knowledge database relating to the electrical equipment assets, wherein each respective associated user of said plurality of users can identify from the at least one database only the at least one associated electrical equipment asset that is operated by the associated user while excluding the plurality of electrical equipment not operated by the associated user and user-provided asset data of the plurality of electrical equipment not operated by the associated user; and a computer system in operative communication with said at least one database, said computer system configured to analyze said user-provided asset data for said plurality of electrical equipment assets in conjunction with said pooled knowledge database, wherein said computer system generates a course of action or assessment from said analysis for one user of said plurality of users and said at least one associated electrical equipment asset based on said user-provided asset data for the plurality of electrical equipment assets and said pooled knowledge database, said pooled knowledge database including aggregate data from the plurality of electrical equipment assets in said pooled knowledge database including any aggregate data from feedback from other users in the plurality of users that have implemented the course of action or assessment, the feedback including at least one of anonymously shared and non-anonymously shared outcomes of actions taken by a user of said other users in response to the course of action or assessment provided to the user of said other users, the non-anonymously shared outcomes complying with at least one of data privacy laws and data privacy rules.

2. The AI/ML driven assessment system of claim 1, wherein said pooled knowledge database includes expert data, industry data, and asset data for said plurality of electrical equipment assets.

3. The AI/ML driven assessment system of claim 2, wherein said asset data includes procedures and reports for operation of said plurality of electrical equipment assets.

4. The AI/ML driven assessment system of claim 2, wherein said pooled knowledge database is separated into classifications based on types of the plurality of electrical equipment assets.

5. The AI/ML driven assessment system of claim 1, wherein said computer system is configured to generate said course of action or assessment using machine learning natural language processing.

6. The AI/ML driven assessment system of claim 1, wherein said course of action or assessment includes one or more of parameter estimation, data forecasting, and failure prediction for said at least one of the plurality of electrical equipment assets.

7. The AI/ML driven assessment system of claim 1, wherein said computer system uses artificial intelligence to generate said recommended course of action or assessment for said at least one of said electrical equipment assets.

8. The AI/ML driven assessment system of claim 1, wherein said plurality of electrical equipment assets include at least one of a transformer and a circuit breaker.

9. The AI/ML driven assessment system of claim 1, wherein said pooled knowledge database is updated by said one of said plurality of users in response to an outcome of said one of plurality of users executing the course of action or assessment on the at least one of the plurality of electrical equipment assets.

10. The AI/ML driven assessment system of claim 9, wherein said computer system is configured to update said analysis for determining said course of action or assessment in response to said update of said pooled knowledge database.

11. The AI/ML driven assessment system of claim 10, wherein each of said plurality of users has access to said computer system for said updated analysis of said user-provided asset data for said plurality of electrical equipment assets in conjunction with said pooled knowledge database without accessing individual analysis of electrical equipment assets not operated by said respective user.

12. The assessment system of claim 11, wherein said plurality of users receive said course of action or assessment based on said updated analysis only for those electrical equipment assets operated by said associated user.

13. A method of assessing at least one electrical equipment asset, comprising:

storing user-provided asset data regarding operation of a plurality of the electrical equipment assets in at least one database, wherein said plurality of electrical equipment assets are operated by a plurality of users, and further wherein each user of said plurality of users can only identify from the at least one database the respective electrical equipment assets and associated user-provided asset data that are operated by the respective user while excluding the plurality of electrical equipment not operated by the associated user and user-provided asset data of the plurality of electrical equipment not operated by the associated user;

generating a pooled knowledge database for the plurality of electrical equipment assets;

acquiring said user-provided asset data and said pooled knowledge database at a computer system in operative communication with said at least one database;

analyzing said user-provided asset data and said pooled knowledge database with said computer system;

generating a course of action or assessment from said analysis for at least one of said plurality of electrical equipment assets; and providing the course of action or assessment to the respective user that operates the at least one of said plurality of electrical equipment assets, wherein said pooled knowledge database includes aggregate data from the plurality of electrical equipment assets in said pooled knowledge database including any aggregate data from feedback from other users in the plurality of users that have implemented the course of action or assessment, the feedback including at least one of anonymously shared and non-anonymously shared outcomes of actions taken by a user of said other users in response to the course of action or assessment provided to the user of said other users, the non-anonymously shared outcomes complying with at least one of data privacy laws and data privacy rules.

14. The method of claim 13, further comprising:
providing a display in operative communication with said computer system; and displaying said course of action or assessment on said display.

15. The method of claim 13, wherein said pooled knowledge database includes expert data, industry data, user procedures, and user reports.

16. The method of claim 13, wherein said computer system is configured to generate said course of action or assessment using machine learning natural language processing.

17. The method of claim 13, wherein said course of action or assessment includes one or more of parameter estimation, data forecasting, and failure prediction.

18. The method of claim 13, wherein said computer system uses artificial intelligence to generate said course of action or assessment.

19. The method of claim 13, wherein:
said pooled knowledge database is updated by said respective user in response to feedback from executing the course of action or assessment on the at least one of the plurality of electrical equipment assets; and
said computer system is configured to update one or more algorithms for performing the analysis based on the feedback.

20. The method of claim 13, wherein:
each of said plurality of users has access to analysis of the user-provided asset data for all of said plurality electrical equipment assets without accessing individual analysis of electrical equipment assets not operated by said respective user; and
said plurality of users receive said course of action or assessment for only the respective electrical equipment assets operated by said respective user.

\* \* \* \* \*